United States Patent [19]

Hedlund

[11] 4,093,959
[45] June 6, 1978

[54] CHROMINANCE SIGNAL TRANSCODING APPARATUS

[75] Inventor: Lee Vern Hedlund, Cinnaminson, N.J.

[73] Assignee: RCA Corporation, New York, N.Y.

[21] Appl. No.: 777,538

[22] Filed: Mar. 14, 1977

[30] Foreign Application Priority Data

Mar. 8, 1977  United Kingdom ............... 11116/77

[51] Int. Cl.² ............................................. H04N 9/02
[52] U.S. Cl. ............................................ 358/4; 358/8
[58] Field of Search ................... 358/4, 8; 360/10, 35

[56] References Cited

U.S. PATENT DOCUMENTS

| 3,660,596 | 5/1972 | Numakura | 358/4 |
| 3,969,757 | 7/1976 | Amery | 358/4 |
| 4,012,771 | 3/1977 | Ishigaki | 358/4 |

*Primary Examiner*—Richard Murray
*Assistant Examiner*—Joseph A. Orsino, Jr.

*Attorney, Agent, or Firm*—Eugene M. Whitacre; William H. Meagher; Henry N. Garrana

[57] ABSTRACT

In a still frame playback mode, a video disc player reproduces a carrier signal which is frequency modulated in accordance with a composite video signal representative of successive repetitions of two interlaced image fields constituting a single image frame and comprising a luminance signal component, a chrominance signal component and synchronizing information, including a color burst. An FM demodulator develops a composite video signal, which is characterized by a 180° phase discontinuity in the chrominance signal component between the frame end and the succeeding frame start. A first inverter circuit inverts the phase of the color burst every other image frame piror to the processing of the composite video signal output in time base correction and drop-out compensation circuits. The corrected output is supplied to a second inverting stage where the phase of the chrominance signal component, exclusive of the color burst, is inverted every other image frame, to provide an output composite video signal conforming to the NTSC format.

7 Claims, 1 Drawing Figure

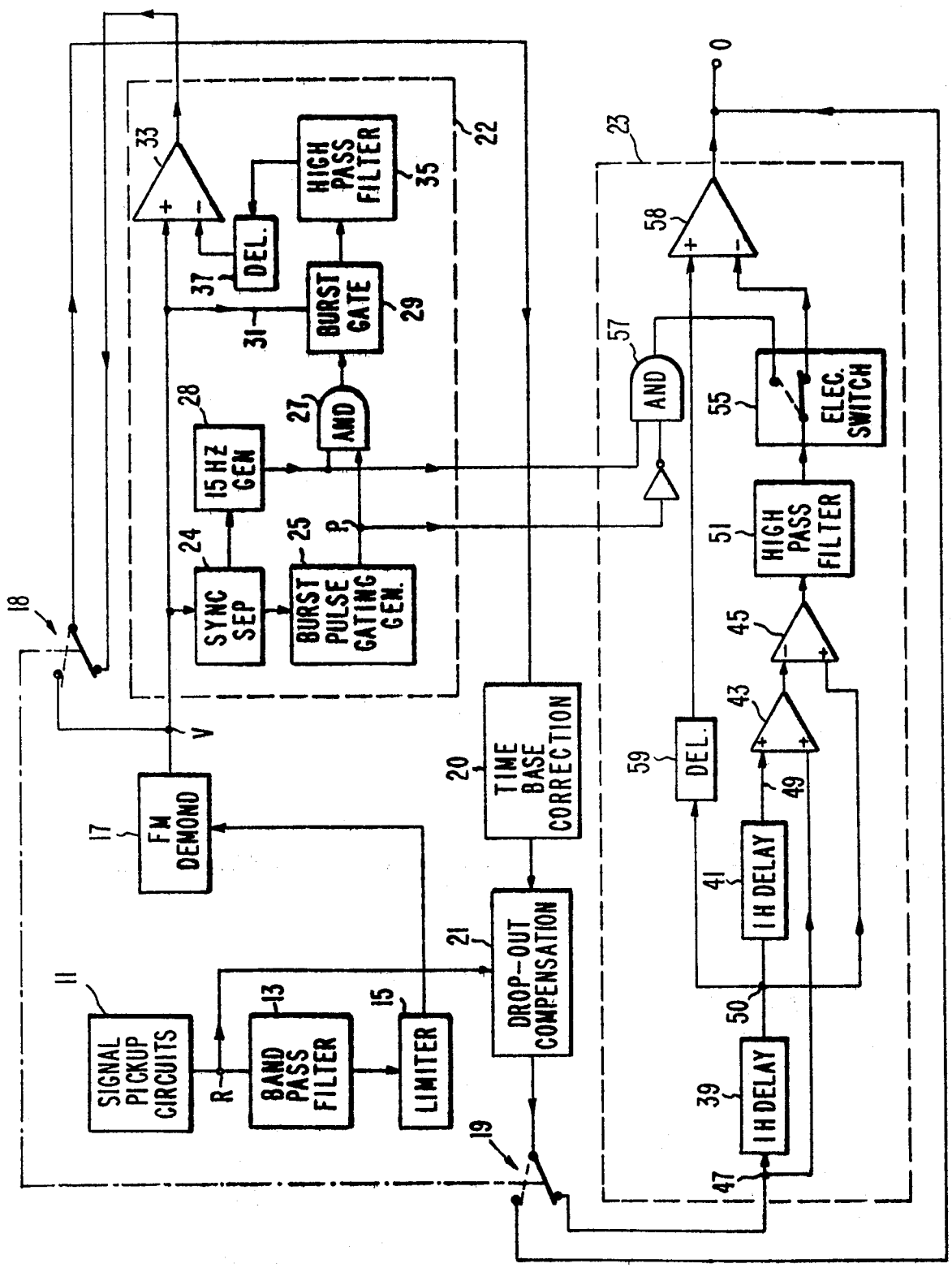

CHROMINANCE SIGNAL TRANSCODING APPARATUS

The present invention relates generally to chrominance signal phase transcoding techniques and apparatus therefor, and particularly to such techniques and apparatus suitable for use in providing, during still frame playback operation of a video record, a composite color video signal substantially free of undesired chrominance signal phase discontinuities.

In U.S. application Ser. Nos. 668,495, filed Mar. 19, 1976 for Fred William Spong, an optical video disc system is described in which information is recorded on a major anti-reflective surface of an optical video disc in the form of a succession of spaced, light reflective pits arranged to alternate with anti-reflective regions in either a spiral track, a circular track or intermixed spiral and circular tracks. During disc playback, the variations in light intensity, reflected as the pits and the anti-reflective regions pass through the path of a focused light, alter the response of a photoconductor which develops a signal representative of the recorded information.

In the above referred to Spong system, the recorded information may be in the form of a carrier signal that is frequency modulated with a composite video signal conforming to a color encoding system specifications (e.g., NTSC, PAL and SECAM). This is especially desirable since the need for further signal processing or transcoding is obviated by the high readout contrast ratio (due to the large differences in reflectance of the pit regions and the intervening track regions, at the light frequency of the playback focused light) which permits recovery of the recorded video signals with an excellent signal-to-noise ratio.

In the operation of the above referenced Spong system, various perturbations, resulting from errors in the relative velocity between the disc track and the photodetectors, can result in spurious variations in the frequencies and subsequently in variation of the time base of the demodulated video signal of the recovered signal components. These various perturbations are compensated for in a time base correction system responsive to the output of a phase detector which compares the synchronizing burst component of the reproduced composite signal with the highly stable output of a reference oscillator operating at the color subcarrier frequency of the system. The time base correction system is conventional in the art and may be generally of the same type as utilized in the RCA TR-600 Television Tape Recorder.

Advantageously, the time base correction system is followed by a drop-out compensation system which effects the substitution of one segment of video information with a preceding segment of video information (with appropriate phase relationships of the various signal components) responsively to the detection of discontinuities in the carrier signal. The drop-out compensation system is also conventional in the art and may generally be of the same type utilized in the RCA TR-600 Television Tape Recorder.

One advantage of an optical disc playback system is the ability to provide a still frame playback feature where the reproduced image of the same video information frame (being played over and over again) appears stationary on the screen of an image reproducing system receiving the video information. In the pursuit of such a playback feature, it is desirable to simplify the playback system by recording, on the disc surface, one frame of information (comprising two interlaced image fields) on a circular information track or on one convolution of a spiral information track.

Repeated traversal of a circular information track or a selected convolution of a spiral information track, in a playback mode of the Spong system, provides a composite video signal representative of a successive arrangement of one segment of video information. The luminance information in that composite video signal is of a format acceptable for ready use after appropriate demodulation of the carrier. The chrominance information in that composite video signal, however, due to the peculiarity of the color information encoding formats (e.g., NTSC, PAL, or SECAM) which may specify variations in the chrominance information from line to line, from field to field and from frame to frame, will not be in a format acceptable for ready use after appropriate demodulation of the carrier.

Illustratively, where video information is recorded on the disc record in the form of a carrier which is frequency modulated with a composite video signal conforming to the NTSC system specifications, the recovered signal, in a still frame playback mode of operation, fails to conform to the NTSC signal format which prescribe that the chrominance signal component correspond to an odd multiple of one-half the line scanning frequency. Because of that frequency relation, the phase of the chrominance signal component changes 180° from line to line as well as from frame to frame. As a consequence, during still frame playback operation when the focused light returns from the end of an image frame to the beginning of that frame, the phase of the chrominance signal monitored by the time base correction system undergoes an abrupt excursion of 180° which the time base correction system interprets as a time base error and subsequently undesirably moves the composite signal.

Where PAL and SECAM color encoded composite video signals are used to modulate the carrier, departures of a recovered composite video signal, in a still frame playback mode of operation, from the respective PAL and SECAM system specifications will also be encountered. While the principles of the present invention are herein illustrated by application to a composite video signal encoded in accordance with NTSC system specifications, it will be appreciated that they can be equally illustrated by application to a composite video signal encoded in accordance with either PAL or SECAM or some other color encoding system specifications.

It has been proposed in the prior art (e.g., U.S. Pat. No. 3,934,262 — Snopko) to effect chrominance signal corrections during still frame operation, for a composite video signal conforming to the NTSC system specifications, by varying the disc playback speed to result in the shifting of the phase of the chrominance subcarrier by one half-cycle in one full revolution of the disc. This frequency shift is generated by disc record speed-up or slow-down on a cyclical basis to eliminate the chrominance subcarrier phase discontinuity. While this proposed solution is adequate to compensate for the 180° shift of the chrominance subcarrier at the boundary between the finish and the start of the same frame of video information thereby eliminating color flicker, the reproduced color dots, however, are stationary, no longer showing the intended temporal interlace, since the phase relationship of the chrominance signal components still fails to conform to the NTSC format (i.e., the phase of the chrominance signal component does not change 180° from frame to frame).

In accordance with the principles of the present invention, the chrominance signal components and the burst synchronization signal are transcoded, during still frame playback operations of a video record, to provide a playback composite video signal having signal components with proper phase relations conforming to the color encoding format of the recorded composite video signal. Illustratively, where the recorded composite video signal is in accordance with NTSC system specifications, the principles of the present invention may be realized by apparatus wherein, in still frame playback mode, the chrominance signal components and the color synchronization burst of the playback signal are reversed on every other replay of the video information frame, thereby restoring correct chrominance phase in accordance with NTSC specifications, eliminating color flicker and providing the reproduced image with the proper temporal interlace of the color dots.

In accordance with further principles of the present invention, means are employed for restoring correct color subcarrier interlace to the recovered composite video signal which restoring means includes means for separating the chrominance signal component from the wideband recovered composite video signals. Bandwidth loss avoidance is enhanced through the use of comb filters to accomplish signal component separation. By a suitable arrangement where the comb filters follow the time base correction system and the drop-out correction system, the defect augmenting effect of the delay lines of the comb filters is eliminated. However, since the time base correction system utilizes the color burst component for its referencing, separate means are utilized to restore proper phasing for the burst signal which means are provided in the arrangement ahead of the time base correction system.

The accompanying drawing illustrates, partially schematically and partially by block diagram representations, optical video disc playback apparatus incorporating chrominance signal correction circuitry in accordance with an illustrative embodiment of the present invention appropriate for use with a recorded composite video signal encoded in accordance with NTSC system specifications.

As illustrated in the drawing, an optical video disc player includes video disc pickup circuits 11 (which may, for example, be of the general type described in the aforementioned Spong application) for developing an output at terminal R which is representative of signals recorded on a video disc (not shown). Illustratively, the recorded signals include picture carrier waves modulated in frequency in accordance with the amplitude of composite color video signals conforming to the NTSC signal specifications with two interlaced image fields, constituting a signal image frame in the NTSC format, occupying substantially one revolution or convolution of the spiral track of the record.

A bandpass filter 13, coupled to terminal R and having a passband encompassing the picture carrier deviation range and significant sidebands thereof, selectively passes the frequency modulated picture carrier waves to a limiter 15, which serves to remove spurious amplitude modulation of the picture carrier waves. The limiter output is applied to a frequency modulation demodulator 17, which recovers the modulating information, developing a composite color video signal, in accordance with the NTSC specifications, at the detector output terminal V.

Where the playback system is to be operated in a continuous playback mode, switches 18 and 19, shown in a mechanical schematic form for the sake of simplicity, are moved to the illustrated broken line position. With the switches in that broken line position, the composite video signal developed at terminal V may be directly transmitted to the time base correction system 20 where the composite video signal is stabilized against time base errors engendered in the playback operations of the disc. Following time base corrections, a drop-out compensation system 21 effects signal substitution in the video domain to compensate for sensed discontinuities of the carrier signal. The output of drop-out compensation system 21 may be directly transmitted via switch 19 to output terminal 0. The signal appearing at terminal 0 is suitable, when coupled to appropriate terminals of a suitable image display apparatus (e.g., a conventional color television receiver SAT) for direct image reproduction.

Where, however, the playback system is to be operated in a still frame playback mode, the composite video signal appearing at terminal R will be characterized by discontinuities of the chrominance signal component at the interface between the end of a frame and the beginning of the succeeding frame whih signal is not in conformity with the NTSC format. In the still frame playback mode, switches 18, 19 are moved to the illustrated solid line positions so that a burst phase inverting circuit 22 may be interposed between terminal V and the time base correction system 20 and a chrominance signal component phase inverting circuit 23 may be interposed between the output of the drop-out compensation system 21 and terminal 0.

In burst phase inverting circuit 22, the composite video signal developed at terminal V is applied to a sync separator apparatus 24 which serves to separate deflection synchronization components of the composite video signal from the picture components thereof, and to develop a plurality of pulse train outputs in response to the separated synchronizing components. The output of sync separator 24 is applied to a burst gating pulse generator 25 which provides, at its output terminal P, a train of keying pulses appearing during the horizontal "back porch" intervals occupied by the color synchronizing component. The output of the burst pulse gating generator 25 is added in AND gate 27 with a 15Hz square wave output of generator 28. The generator 28 may be keyed by the equalizing pulses of the composite video signal so that the positive-going portion of the 15Hz pulse corresponds in time with the every other video frame during which the chrominance signal component must be phase inverted. Thus, the output of AND gate 27 is a train of keying pulses appearing only during the horizontal "back porch" intervals of the video frame in which the phase of the chrominance signal component is to be inverted.

The output of AND gate 27 enables a burst gate 29 to complete a path 31 between terminal V and the inverting input of a summing amplifier 33. Interposed in path 31 is a high pass filter 35, which eliminates spurious components of the "back porch" interval, and a delay 37 which provides for the fine adjustment of the timing of the "back porch" interval relative to the wide band composite video signal. Amplifier 33 also receives, at a non-inverting terminal thereof, the wide bandwidth composite video signal developed at terminal V. The inverting input terminal of amplifier 33 has a gain factor of 2:1 with respect to the non-inverting input terminal so that when the burst signal sums in the amplifier with the wide band composite video signal the resultant is a simple inversion of the color synchronization signal.

The wideband composite video signal appearing at the output of burst inverting circuit 22 contains a color synchronization component which is of the proper phase in accordance with the NTSC format and which may therefore be applied to the time base correction system 20 to effect stabilization of the composite video signal. The output of the time base correction system is, in turn, applied to the drop-out compensation system 21 to correct for carrier defects as hereinabove described.

The signal output of the drop-out compensation system 21 therefore comprises a composite video signal, corrected for time base errors and carrier drop-outs engendered in the playback operation, in conformity with the NTSC format except for the phase of the chrominance signal component (i.e., the chrominance signal component does not change 180° from frame to frame).

To effectuate the desired phase reversal of the chrominance signal component, a comb filter made up of a pair of 1H delay elements 39, 41 and a pair of combining amplifiers 43, 45 is utilized to separate the chrominance signal component from the wideband composite video signal. The operation of such a comb filter is well known in the art, and may be readily understood by considering that at any given time the luminance and chrominance signal components present at nodes 47, 49 will be additive and are additively combined in amplifier 43. The output of amplifier 43 is in turn subtractively combined in amplifier 45 with the composite video signal present at node 50 in the respective ratio of 1:2. Since the chrominance signal component developed at node 50 is of opposite polarity to the chrominance signal component developed at nodes 47, 49 since they are one horizontal line apart, the luminance signal components will substantially cancel each other, leaving the chrominance signal components at the output of amplifier 45. The output of amplifier 45 is coupled through a high pass filter 51, which eliminates low frequency luminance components which may accompany the chrominance signal components, to one terminal of an electronic switch 55, shown in a mechanical schematic form for the sake of simplicity.

The electronic switch 55 is controlled by means of a train of pulses developed by anding in AND gate 57 the 15Hz pulse train developed by generator 28 with the inverted output of the burst pulse gating generator 25. The resultant is a control pulse comprising a train of keying pulses which enable the switch 55 during the video frame interval in which the chrominance signal component is to be inverted excluding the "back porch" interval.

Switch 55 completes a signal path coupling the output of high pass filter 51 with the inverting input terminal of a combining amplifier 58. A non-inverting input terminal of amplifier 58 receives the wideband composite video signal appearing at node 50 after it being subjected to a time delay 59 to synchronize the signal timing. The signal applied at the inverting input terminal of amplifier 58 is combined with a gain factor of 2:1 with respect to the signal applied at the non-inverting input terminal so that when the input signals to the amplifier are combined during the video frame interval in which the phase of the chrominance signal component is to be reversed, the effect is a simple inversion of the phase of the chrominance signal component and the output of the amplifier 58, appearing at terminal 0, is a composite video signal in conformity with the NTSC system specifications.

What is claimed is:
1. Chrominance signal transcoding apparatus, for use with a source of composite video signals representative of successive repetitions of two interlaced image fields constituting a single image frame and comprising a luminance signal component, a chrominance signal component and synchronizing information, including a color burst; said apparatus comprising:
   means, responsive to said composite video signal, for identifying the time interval occupied by each image frame;
   means, subject to being coupled to the output of said source of composite video signals, for altering the phase of the color burst in response to the output of said time interval identifying means;
   circuit means, subject to being coupled to the output of said color burst altering means, including means responsive to the phase of the color burst, for stabilizing the chrominance signal component against spurious frequency variations;
   means for effecting signal substitution in response to the detection of a defect in said composite video signal; and
   means, subject to being coupled to the output of said circuit means, for altering the phase of the chrominance signal component in response to the output of said time interval identifying means without altering the phase of the color burst.
2. Apparatus in accordance with claim 1 wherein:
   said chrominance signal component altering means includes comb filter means coupled to the output of said substitution effecting means for substantially separating the chrominance signal component from the wideband composite video signal; and means for subtractively combining the delayed wideband composite video signal with the output of the separating means responsively to the output of said time interval identifying means.
3. Apparatus in accordance with claim 2 wherein:
   said comb filter means includes a pair of serially connected 1H delay lines.
4. Apparatus in accordance with claim 2 wherein:
   said chrominance signal component altering means includes an electronic switching means, responsive to a control pulse developed in response to both the output of said frame time interval identifying means and the output of a means for identifying the time interval occupied by said color burst, for passing the separated chrominance signal component substantially unmodified during the time interval occupied by every other single image frame.
5. In a video disc record player for developing a carrier signal which is frequency modulated in accordance with a composite video signal representative of successive repetitions of two interlaced image fields, constituting a single image frame, and comprising a luminance subcarrier, a chrominance subcarrier and synchronizing information including a color burst; the combination comprising:
   frequency modulation detector coupled to the output of said playback apparatus for developing a composite video signal;

means, responsive to said composite video signal, for identifying the time interval occupied by each image frame;

circuit means, including means responsive to the phase of the color burst, for stabilizing the chrominance subcarrier against spurious frequency variations accompanying disc playback, and means, for effecting signal substitutions in the video domain responsively to the detection of the defect in said carrier signal;

a first signal path for coupling the output of said detector to said circuit means;

a second signal path for coupling the output of said circuit means to an output terminal;

first means for altering the phase of the color burst of said composite video signal responsively to the output of said time interval identifying means;

second means for altering the phase of the chrominance subcarrier responsively to the output of said time interval identifying means without altering the phase of the color burst;

means for selectively interposing said first and second phase altering means in said respectively first and second signal paths.

6. Apparatus in accordance with claim 5 wherein: said chrominance subcarrier altering means includes a pair of serially connected 1H delay lines coupled to the output of said substitution effecting means; means coupled to the output of said substitution effecting means and to the outputs of said 1H delay lines for substantially separating the chrominance signal component from the wideband composite video signal; and means for subtractively combining the delayed wideband composite video signal with the output of the separating means in response to the output of said time interval identifying means.

7. Apparatus in accordance with claim 5 wherein: said chrominance subcarrier altering means includes an electronic switching means, responsive to a control pulse developed in response to both the output of said frame time interval identifying means and the output of a means for identifying the time interval occupied by said color burst, for passing the separated chrominance signal component substantially unmodified during the time interval occupied by every other single image frame.

* * * * *